United States Patent [19]

Gordon

[11] Patent Number: 4,964,562
[45] Date of Patent: Oct. 23, 1990

[54] GABLE TOP CONTAINER HAVING A POUR SPOUT FITMENT

[75] Inventor: Robert L. Gordon, Monroe, N.Y.

[73] Assignee: International Paper Co., Purchase, N.Y.

[21] Appl. No.: 371,897

[22] Filed: Jun. 27, 1989

[51] Int. Cl.⁵ .............................................. B65D 5/74
[52] U.S. Cl. .............................. 229/125.15; 220/258; 220/288; 493/87
[58] Field of Search ...................... 229/125.14, 125.15; 220/258, 288; 222/541, 551, 566; 493/87, 374, 393

[56] References Cited

U.S. PATENT DOCUMENTS

| | | | |
|---|---|---|---|
| 2,400,716 | 5/1946 | Sattler | 229/125.15 |
| 3,432,069 | 3/1969 | Craig | 220/288 |
| 3,731,835 | 5/1973 | Hawkins . | |
| 3,990,603 | 11/1976 | Brochman | 220/260 |
| 4,016,807 | 4/1977 | Schellenberg | 229/5.5 |
| 4,108,330 | 8/1978 | Patterson | 220/260 |
| 4,135,637 | 1/1979 | Hannula | 220/260 |
| 4,170,314 | 10/1979 | Weierman | 220/260 |
| 4,227,629 | 10/1980 | Froyman | 222/566 |
| 4,266,993 | 5/1981 | Olsen | 156/73.1 |
| 4,397,401 | 8/1983 | Ueno et al. | 220/260 |
| 4,507,168 | 3/1985 | Konaka | 493/87 |
| 4,595,116 | 6/1986 | Carlsson | 220/260 |
| 4,636,273 | 1/1987 | Wolfersperger | 220/260 |
| 4,669,627 | 6/1987 | Ueda et al. | 229/117.22 |
| 4,798,296 | 1/1989 | Lagerstedt et al. | 206/631.2 |
| 4,813,578 | 3/1989 | Gordon et al. | 222/541 |
| 4,830,273 | 5/1989 | Kalberer et al. | 220/288 |

Primary Examiner—Gary Elkins

[57] ABSTRACT

A construction for attaching a flanged pour spout to a gable top type paperboard carton blank for packaging potable liquids. The blank is provided with a barrier layer on its inner and outer forming surfaces, and a pour spout extending out from one gable forming panel. An opening is die cut in this panel, and the barrier layers applied. These layers span the opening. Thereafter, a pouring aperture is cut in the barrier layers which span the opening. An annular seal between the two barrier layers is formed by pressing the layers together while applying ultrasonic vibrations to them. The flange of the pour spout is adhered to the outer barrier layer, also by pressing and applying ultrasonic vibrations. By this construction, the edges of the opening in the paperboard are sealed and cannot contaminate the liquid within a carton formed from the blank.

7 Claims, 2 Drawing Sheets

GABLE TOP CONTAINER HAVING A POUR SPOUT FITMENT

BACKGROUND OF THE INVENTION

This invention relates to paperboard containers of the gable top type. Such containers are widely used in the food industry for the packaging of potable liquids such as milk and fruit juices. Dispensing of the liquid contents has conventionally been done by ripping open one end of the gable top and pulling out a foldable pour spout, then refolding and reinserting the pour spout and partially closing the container after dispensing.

More recent gable top paperboard carton constructions have employed a fitment type pour spout, namely, a rigid pour spout usually formed of a plastic material and affixed to one of the two flat sides of the gable top. In such a construction, the spout is conventionally provided with a screw cap. For dispensing with this type of carton, the user unscrews the screw cap and pours a desired quantity of liquid and then recloses the carton by threading the cap back on the spout. A construction of this type of liquid dispensing container is shown in U.S. Pat. No. 4,483,464 issued to Nomura. However, the Nomura construction requires a relatively complicated configuration for effective initial opening, because a vapor barrier layer must be first ruptured to gain access to the contents. Such barrier layers, covering the paperboard surfaces, are commonly employed in this art to protect the contents of the carton from chemical or physical degradation from a variety of influences. Another example of this latter type of gable top carton is shown in U.S. Pat. No. 4,813,578 issued to Gordon et al. In the Gordon et al construction, a flanged plastic spout fitment is employed, in combination with the concept of extruding the barrier layer of material over the preformed dispensing opening in the paperboard over which the pour spout is positioned, the construction being such that the raw edges of the dispensing opening in the paperboard are covered to thereby protect the contents of the carton (fruit juice for example) from coming in contact with these raw edges. The Gordon et al construction, however, permits the raw edges to come in contact with the liquid contents after the initial pour spout opening and dispensing of the liquid product.

SUMMARY OF THE INVENTION

According to the practice of this invention, a rigid pour spout construction for a paperboard carton particularly adapted to contain potable liquids is provided which will protect the contents of the carton from possible contamination by the edges of the dispensing opening in the paperboard at all times, even subsequent to initial opening. According to the construction of this invention, the barrier layer material is first extruded over a die cut opening in one of the roof forming panels of the blank from which the container is formed. Then, a pouring aperture, of lesser diameter than the opening in the paperboard, is cut through the parallel barrier layers which are on the external and the internal surface of the blank. By means of an otherwise conventional ultrasonic pressing operation, an annular seal zone between the two barrier layers and around the pouring aperture is formed. The flange of the pour spout is adhered to the outer surface of the outer barrier layer, with the operations of sealing the barrier layers together and of adhering the flange preferably being carried out simultaneously by an ultrasonic pressing operation. By virtue of this construction, an annular seal between at least portions of the barrier layers which lie radially within the die cut opening are sealed together at all times to thereby isolate the raw edges of the die cut opening from contact with the liquid contents of the container. The invention is not limited to pressing with ultrasonic vibrations. Heat and substantially uniform pressure alone may be employed. Further, if one or both of the barrier layers includes a metal foil, induction heating can be employed to seal the barrier layers together.

DETAILED DESCRIPTION OF THE INVENTION

Figure 1:
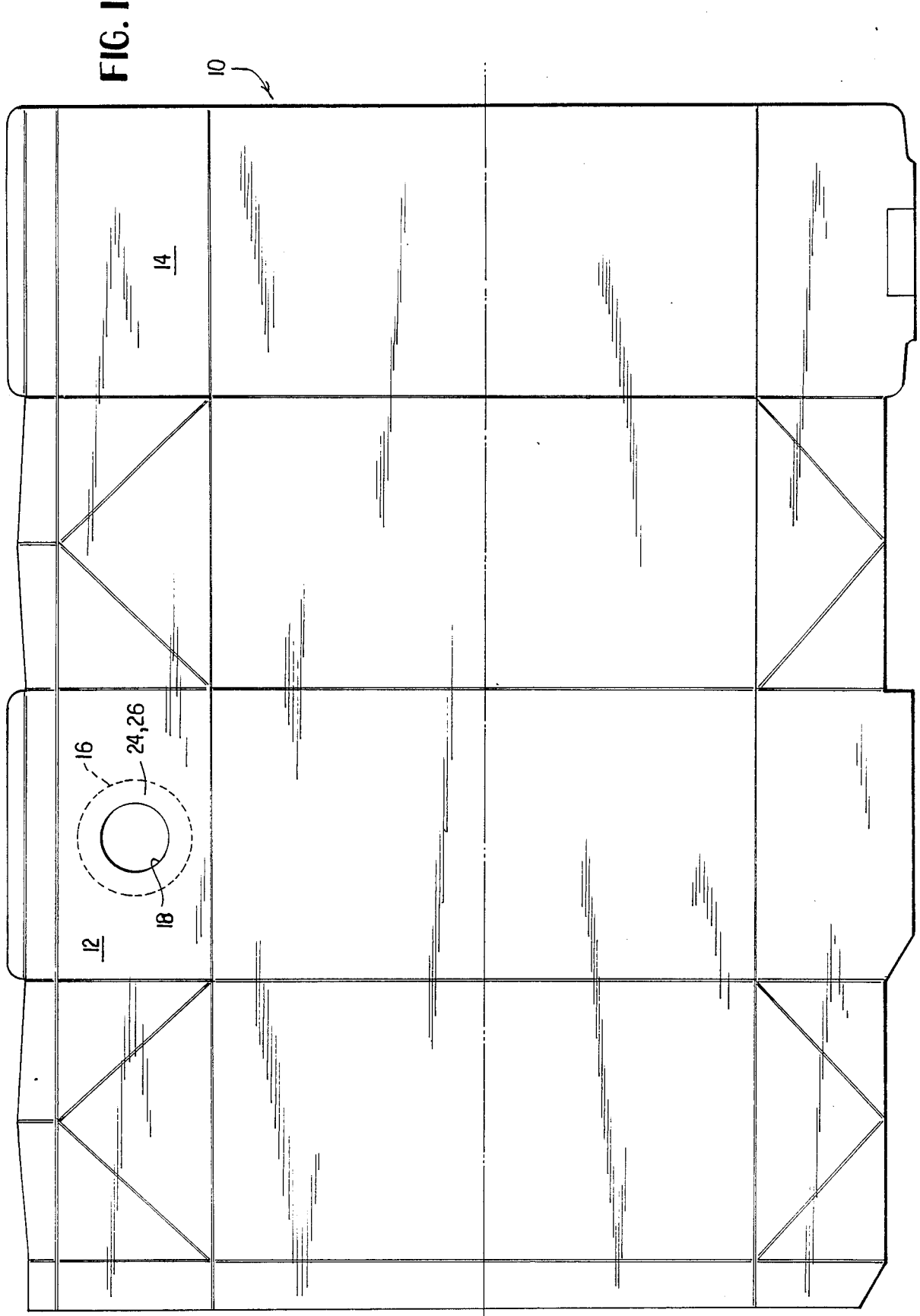
FIG. 1 is a plan view of an otherwise conventional gable top type carton blank from which the carton of this invention is formed, and shows both a die cut opening at one of the roof forming panels of the blank, as well as a pouring aperture formed in the two barrier layers which span the die cut opening. The view is of that blank surface which forms the carton exterior.

Referring now to FIG. 1 of the drawings, the numeral 10 denotes an otherwise conventional paperboard blank having a plurality of panels defined by fold lines. The blank includes a series of upper panels which includes slanted roof forming panels 12 and 14. One of these panels is provided with a die cut opening 16, the opening exending completely through the paperboard from which the blank 10 is formed. The numeral 18 denotes another opening, termed a pouring aperture, this pouring aperture defined by an opening in the barrier layers 24, 26 which cover both the interior forming and exterior forming surfaces of the blank 10 and which span opening 16. It will be understood that the concept of applying barrier layers to both surfaces of a paperboard blank from which a container is fashioned is known in this art, as may be seen by reference to U.S. Pat. No. 4,595,116 issued to Carlsson and the Gordon patent.

Figure 2:
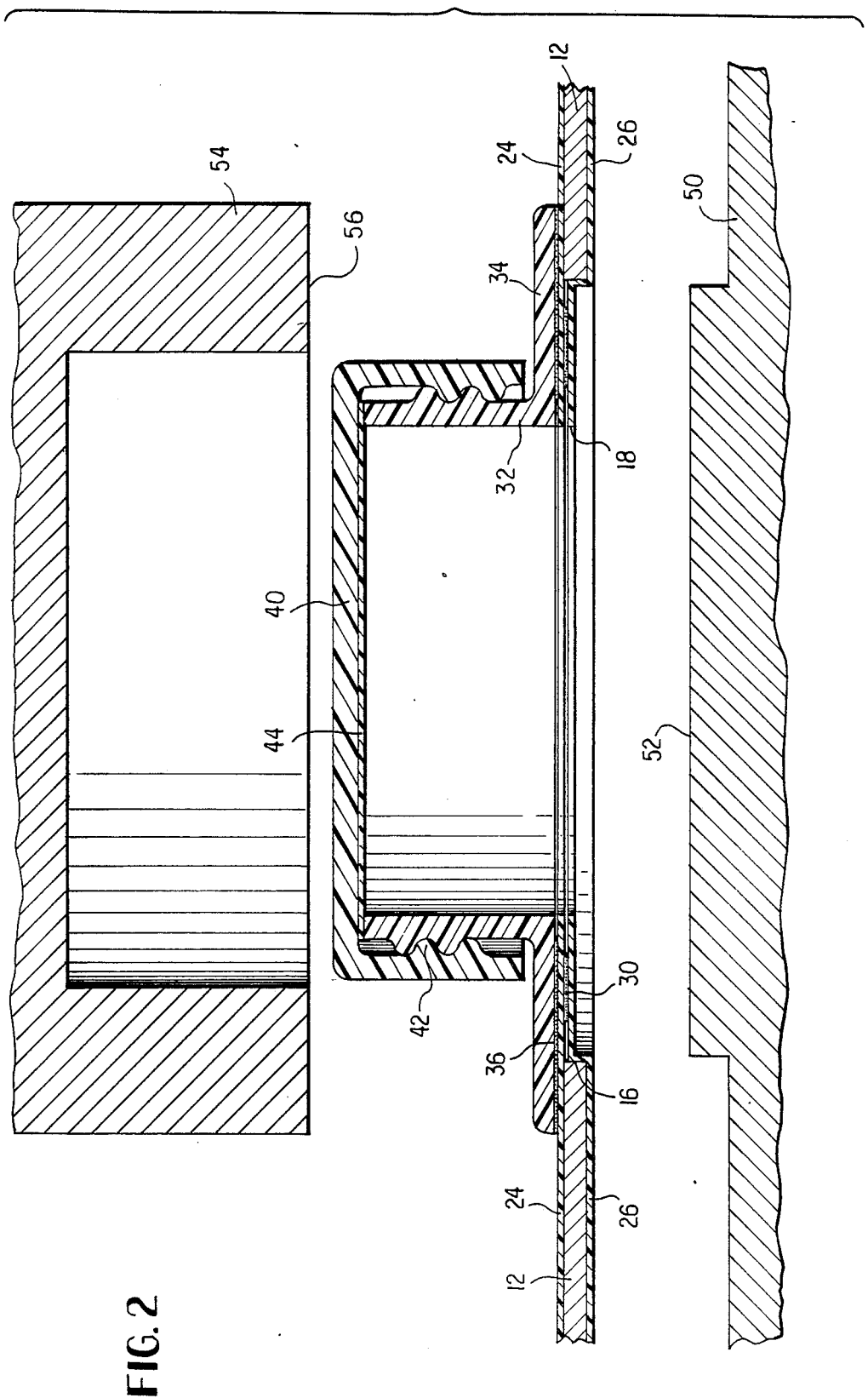
FIG. 2 illustrates a cross section through a roof panel provided with a flanged pour spout, and further illustrates the steps of forming an annular seal between barrier layers and the installation of the pour spout.

Referring now to FIG. 2 of the drawings, a cross section of the pour spout and a partial cross section of roof panel 12 shows the die cut opening 16 in panel 12, the opening 16 having been die cut from the blank 10 prior to the application of upper barrier layer 24 and lower barrier layer 26. The upper surface of panel portion 12 will form an outside surface of the carton while the lower surface as shown in FIG. 2 will form a portion of the carton interior surface. After the application of the barrier layers 24 and 26 to blank 10, a pouring aperture 18, preferably also die cut, is formed in barrier layers 24 and 26. Thereafter, a (typically plastic) pour spout 32 having an integral flange 34 is placed as indicated, with the bottom surface of flange 34 contacting the upper surface of upper barrier layer 24. A screw cap 40 having internal threads 42 which engage complementary threads on the exterior surface of spout 32 is provided prior to permanently attaching the spout to the blank. It will be understood, however, that cap 40 may be applied after the steps now to be described. A frangible aseptic seal membrane 44 of aluminum foil is sealingly secured to the top of the spout lumen. Next, a backup support mandrel 50 is moved upwardly from its indicated position so that its raised flat surface 52 abuts that portion of the lower surface of lower barrier layer 26 which is radially within the confines of opening 16. This causes that portion of barrier layer 26 within opening 16 to assume the indicated upwardly displaced configuration (from the lower surface of panel portion 12) to match that of raised portion 52. At substantially this same time, a sonic sealing head 54 having a lower annular surface 56, is placed on top of the upper surface of spout flange 34. Portions of the panel 12 radially outwardly of opening 16 lie on mandrel 50. With elements 50 and 54 pushed together and squeezing flange 34 and barrier layers 24, 26 together, ultrasonic sealing head 54 is activated, thereby applying both heat and pressure to the squeezed barrier layer portions 24 and 26 which are within opening 16, and also to flange 34. At those aligned portions of raised mandrel portion 52 and annular surface 56 of sealing head 54, an annular seal 30 is formed between barrier layers 24 and 26. Further, an annular seal 36 is formed between upper barrier layer 24 and a portion of flange 34. The mandrel and ultrasonic sealing head are now removed.

The unitary blank 10, now provided with pour spout 32 and seals 30 and 36, is then folded to define a gable top type paperboard container. The container is then filled from the top, and the gable top upper panels are sealed, in a conventional manner, to define the completed paperboard container having a liquid therein.

In operation, the consumer unscrews the cap from the spout, ruptures the sealing membrane 44 at the top of the spout and pours the desired amount of liquid out of the carton. After dispensing, the screw cap is replaced on the spout and the carton stored until the next dispensing operation. From a consideration of FIG. 2, it will be apparent that the raw edge of opening 16 is not only sealed and thereby isolated from the liquid contents of the carton prior to initial opening, but is also sealed at all times. Thus, there is never a possibility of the raw edge of opening 16 of paperboard panel 12 contaminating the liquid.

The noted Carlsson patent shows the broad concept of sealing the raw edge of an opening in a paperboard container by spanning the opening with barrier layers on both sides of the paperboard and then forming a pouring aperture, through the barrier layers, of a diameter less than that of the opening in the paperboard. The aperture is then sealed, as indicated by the numeral 14 at FIG. 3C of the Carlsson patent. However, this construction lacks the spout 32 of the present invention and, equally important, the method of formation of the edge or seal 14 of the pouring aperture appears to require the presence of flexible cover strip 8 on the outside of the container, as shown at FIGS. 1 and 2 of Carlsson. According to the Carlsson disclosure, it would not be possible to form the edge 14 of pouring opening 7, and thus isolate the raw edge 12 of the opening from the contents of the carton, without a flexible sealing strip 8, as explained at the top of column 7 of that patent. Thus, the construction of Carlsson is not capable of being applied to a construction where the carton employs a pouring spout for dispensing.

The material of construction of spout 32 is preferably of a plastic, such as polyethylene. The specific thermoplastic defining the barrier layers 24 and 26 and their method of application to the paperboard are known to workers in this art. The ultrasonic sealing head 54 employed in one example of the invention was manufactured by Branson Sonic Company. The maximum compressive force between mandrel 50 and sealing head 54 was between 40 and 80 psi prior to initiation of ultrasonic vibrations.

The terms upper, lower, and the like are employed to facilitate the description of the invention and are not intended as terms of limitation.

I claim:

1. A pour spout construction for a paperboard carton, the carton adapted to contain a liquid to be dispensed, the construction including a paperboard carton which has an opening in a planar portion of the carton, both outer and inner surfaces of said planar paperboard portion which are contiguous to and radially outwardly of the periphery of said opening being each covered with a barrier layer material, said two barrier layers also extending radially inwardly of the periphery of said opening, a pouring aperture through the two barrier layers, said aperture being radially inwardly of the periphery of said planar portion opening, a rigid pour spout having an integral annular flange, said flange adhered to said outer barrier layer, the bore of said spout being substantially aligned with said opening, an annular zone of said barrier layers located radially within said opening being sealingly adhered together, whereby the raw edge of the opening in the paperboard is sealed by the barrier layers and cannot contaminate any contents of the carton either before or after opening.

2. The pour spout construction of claim 1 wherein the entire inner and outer surfaces of the carton are provided with said barrier layer material.

3. The pour spout constructioin of claim 1 wherein the bore of said spout is aligned with said pouring aperture.

4. The pour spout of claim 3 wherein the periphery of the bore of said spout is aligned with the periphery of said pouring aperture.

5. A method of affixing a flanged pouring spout to a flat portion of a paperboard panel, a thermoplastic barrier layer material coated on both the panel exterior and interior surfaces, respectively termed upper and lower surfaces, said flat panel portion having an opening extending through the paperboard, the edge of the opening termed a raw edge, said opening spanned by both upper and lower barrier layers, the method including the steps of, forming a pouring aperture through both of said barrier layers which span said opening, the diameter of said pouring aperture being less than the diameter of said opening, placing the flange of a flanged spout on the top surface of said upper barrier layer, the spout being aligned with said pouring aperture, pressing said upper and lower barrier layers which are located within the opening together in the presence of heat to fuse the barrier layers together to form an annularly continuous seal around said pouring aperture between at least a portion of their facing surfaces, and simultaneously adhering said spout flange to said upper barrier layer, whereby the raw edge of the opening in the paperboard is sealed by the barrier layers.

6. The method of claim 5 wherein the steps of pressing the upper and lower barrier layers together and of adhering said spout flange are carried out in the presence of ultrasonic vibrations.

7. The method of claim 5 wherein said panel is a roof panel of a unitary blank for forming a gable type carton, and including the additional step of folding the blank to form a gable top type carton.

* * * * *